March 18, 1924.

M. SCHEY 1,487,481

BROILING APPARATUS

Filed Jan. 19, 1922      3 Sheets-Sheet 1

INVENTOR.
Max Schey
BY Jas. H. Griffin
ATTORNEYS.

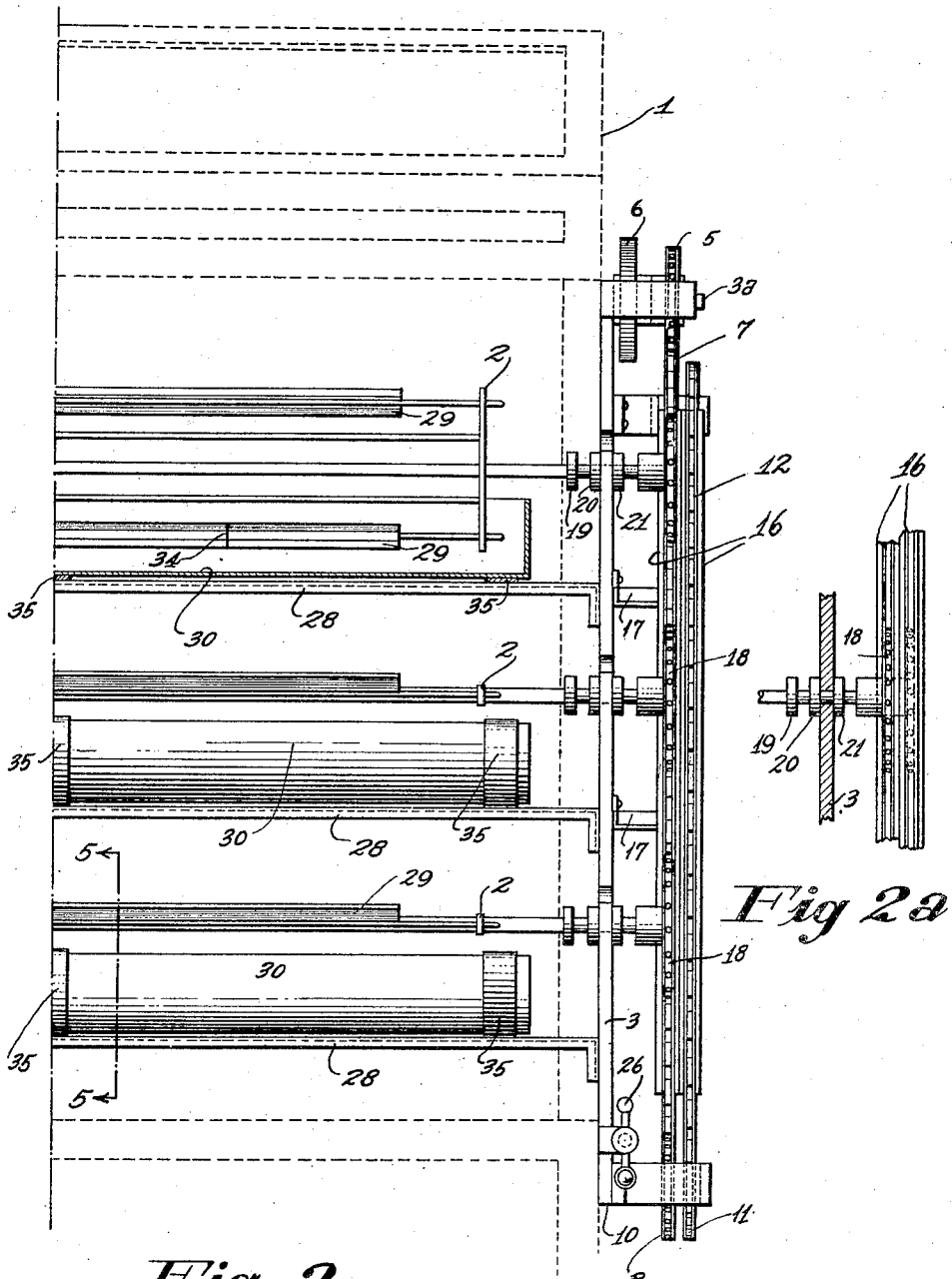

March 18, 1924.

M. SCHEY

BROILING APPARATUS

Filed Jan. 19, 1922  3 Sheets-Sheet 3

INVENTOR.
Max Schey
BY Jas. H. Griffin
ATTORNEYS.

Patented Mar. 18, 1924.

1,487,481

UNITED STATES PATENT OFFICE.

MAX SCHEY, OF BROOKLYN, NEW YORK.

BROILING APPARATUS.

Application filed January 19, 1922. Serial No. 530,241.

*To all whom it may concern:*

Be it known that I, MAX SCHEY, a citizen of the United States, residing at New York city, borough of Brooklyn, county of Kings, and State of New York, have invented a certain new and useful Broiling Apparatus, of which the following is a specification.

This invention relates to a broiling apparatus of the general character described and claimed in my co-pending application Serial No. 420,189. In this general form of apparatus a plurality of spits are mounted for rotation on horizontal axes before a suitable source of heat which may, in practice, be one or more coal fires or one or more gas or electric heating units. Meat or fowl are adapted to be supported on the spits and the spits rotated so as to revolve the meat or fowl to present all parts thereof to the heat for the purpose of effecting uniform broiling thereof.

In my co-pending application Serial No. 420,189, an apparatus of this general character is described and claimed and I have set forth therein practical and efficient means for supporting the spits for adjustment toward and away from the source of heat to the end that the heat supplied to the broils may be properly regulated.

In carrying out the present invention, I preferably employ the same general form of spit supporting means as is disclosed in my application Serial No. 420,189 and the present invention is particularly directed to the provision of means whereby the broils carried on the several spits may be basted when desired with the grease or drippings caught by drip pans supported beneath each spit. In carrying out the present invention, each spit has associated therewith its own individual drip pan which is so mounted with respect to the spit that both the drip pan and spit are simultaneously adjustable in synchronism toward and away from the fire so that the spit and its drip pan are at all times in cooperative relation. During the process of broiling meat or fowl supported on the spits, the grease or drippings are caught by the respective drip pans, and with each spit are associated ladles so positioned that, through the rotation of the spit, they are caused to pass through the grease in the cooperative drip pans. These ladles are preferably so formed that, when the spit is rotated in one direction the ladles will dip up the grease and, upon further rotation of the spit, will pour such grease over the broil, while, when rotated in the opposite direction such ladles are adapted to idly pass through the grease without picking up any of said grease. With this construction in mind, it will be apparent that the rotation of the spits in one direction will effect basting of the broils while rotation of the spits in the opposite direction may be accomplished without basting of the broils.

The present invention further contemplates a construction which will permit of the basting of broils on one spit while broils on another spit may be cooking without basting although the machine is capable of operation to simultaneously baste all broils or to entirely eliminate such basting. To this end, the machine embodies means for driving the spits in opposite directions. That is to say, the spits may be individually driven in either one direction or the other to permit or preclude the basting operation as referred to.

In one practical manner of carrying out the invention, each spit may be provided with a sprocket gear which, upon placement of the spit in the machine, may be brought into engagement with either one of two sprocket chains which chains are operated to travel in opposite directions. As a result of this construction, the engagement of the sprocket wheel with one chain will rotate the spit in one direction and effect a basting, while engagement of the sprocket gear with the other chain will cause the spit to be rotated in the opposite direction without attendant basting. This construction permits of the chef shifting the spits to render them responsive to the operations of either chain in accordance with the desire of the chef to utilize or not utilize the basting functions of the machine. The specific form of spit employed may be varied within wide limits without departing from this invention, the essential feature being that one or more ladles will be mounted for rotation coaxially of the spit so that during rotation of the spit the ladles will be rotated to permit of basting in the manner described.

Features of the invention, other than those adverted to, will be apparent from the hereinafter detailed description and claims, when read in conjunction with the accompanying drawings.

The accompanying drawings illustrate different practical embodiments of the invention, but the constructions therein shown, are to be understood as illustrative, only, and not as defining the limits of the invention.

Figure 1 is a side elevation of a broiling apparatus embodying the present invention.

Figure 1ª is a detailed fragmental view of an apparatus of the construction shown in Figure 1 in dotted lines.

Figure 2 is a front elevation of one lateral half of the machine shown in Figure 1.

Figure 2ª is a fragmental view of an apparatus of the machine shown in Figure 2, showing how the sprocket of one of the spits may engage with either one drive chain or the other.

Figure 4:
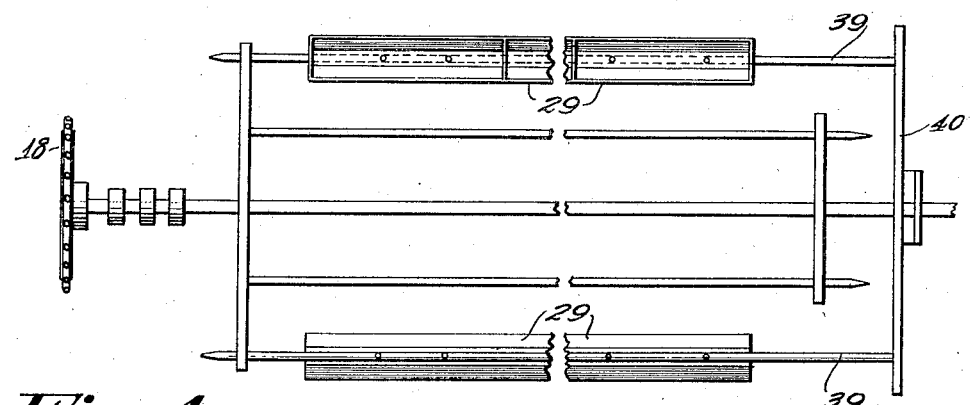
Figure 4 is a front elevation of a slightly modified form of spit, the spit shown in Figure 4 being of the construction shown in Figure 2.

Figure 4ª is a fragmentary plan view of a part of the construction shown in Figure 4.

Figures 5, 6:
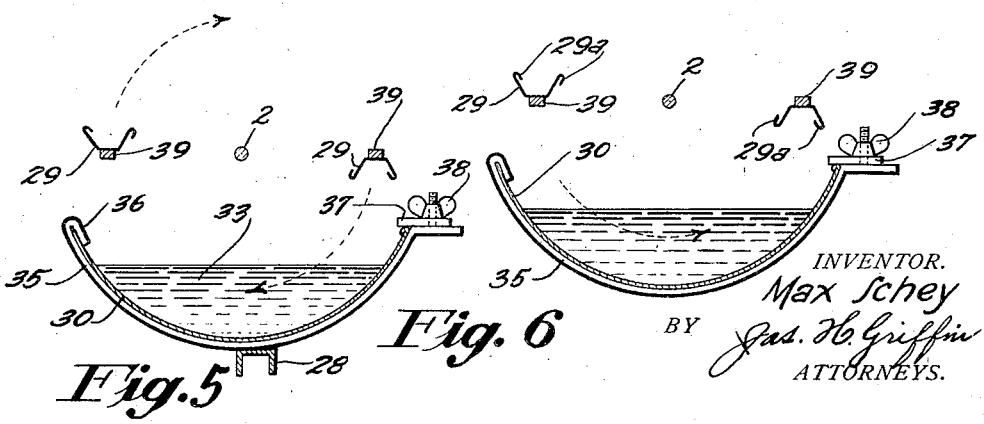

Figure 5 is a fragmentary section on the line 5—5 of Figure 2 showing, in a more or less diagrammatic way, the manner in which the ladles of the spit operate to effect the basting operation, and Figure 6 is a view similar to Figure 5 but illustrating how a reversal in direction of rotation of the spit will eliminate the basting operation.

Figure 1:
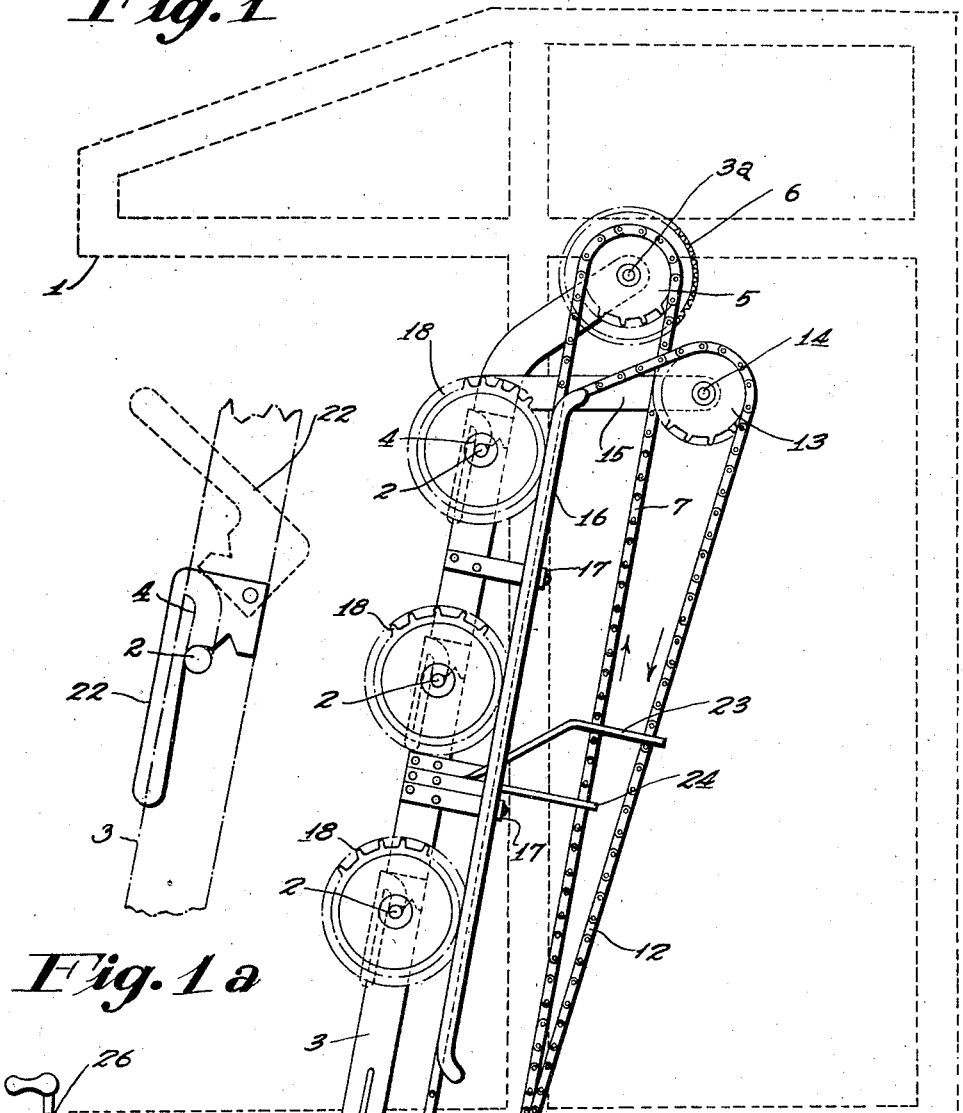
Figure 1A:
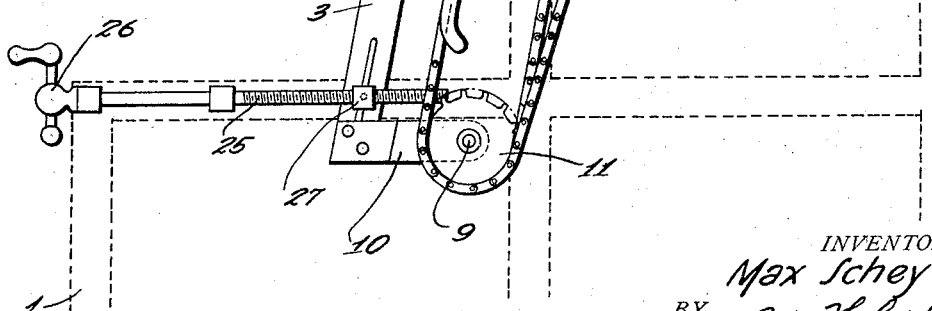

In Figures 1 and 2 of the drawings I have shown in dotted lines a broiling apparatus of a form well-known on the market. It is designated generally by reference numeral 1 and embodies a metal frame supporting sheet metal plates, enclosing ovens, gas connections, etc., and supporting at the front thereof a plurality of coal grates or one or more upright gas or electric heating units.

In Figures 1 and 2, a plurality of spits 2 are shown and, in practice, any number of these spits may be employed depending upon the capacity of the rotisseries which are made in different sizes and embody different numbers of spits.

In the preferred manner of carrying out the present invention the spits are carried or supported on swinging brackets 3, one of which is pivoted at its upper end to each side of the machine as at 3ª. Each bracket is provided with vertically spaced bayonet-shaped slots 4 adapted to receive the spits so that when the spits are brought into engagement with the slots they will be supported in horizontal positions before the fire in a freely rotatable manner.

Mounted co-axially with one of the pivots 3ª is a sprocket 5 adapted to be driven through a gear 6 from any suitable source of power and passing over this sprocket 5 is a sprocket chain 7 which passes downwardly and about a sprocket 8 rotatable on a spindle 9 which is rigidly carried by a rearwardly extending arm 10 which is rigid with the corresponding bracket 3.

Also mounted on the spindle 9 is a second sprocket 11 about which passes a second sprocket chain 12 which reaches upwardly and over an upper sprocket 13 carried by spindle 14 supported on an arm 15 rigid with and extending rearwardly of the associated bracket 3. Guides 16 are associated with the forward reaches of both sprocket chains 7 and 12 and these guides, which may be in the form of channel iron, are parallel to each other and to the adjacent bracket 3 from which they are supported by means of angles 17. The chain 12 is driven from the chain 7 the back reach of which meshes with a sprocket mounted on the spindle 14 alongside of the sprocket and, as a result of this construction, it will appear that when the gear 6 is rotated to drive the sprocket chain 7 in one direction, for example, that shown by the arrow in Figure 1, the chain 12 will be caused to travel in the opposite direction.

The forward reaches of the chains 7 and 12 run parallel and side by side and each of the spits 2 carries a gear or sprocket 18 of such diameter, that, when the spits are supported in the bayonet slots 4, the gears 18 will engage with either one or the other of the chains 7 or 12. This engagement may be definitely determined by mounting on the shank of each spit 3 fixed collars 19, 20 and 21 so positioned that, if the shank of the spit between the collars 19 and 20 is caused to engage with the bracket 3, as shown in Figure 1, the sprocket 18 will automatically come into mesh with the chain 12. In a similar manner, the engagement of that portion of the shank of the spit between the collars 20 and 21 with the bracket 3 as shown in Figure 2, will automatically bring the gear 18 into engagement with the chain 7. Thus, the gear may be brought into engagement with either chain and will be rotated in either direction, depending upon the chain with which it is brought into engagement. If desired, the spits may be locked against inadvertent displacement from the slots 4 by means of manually operable catches 22 as shown in Figure 1ª, but, in practice, this is not absolutely essential. The back reaches of the chains 7 and 12, moreover, may be guided by fingers 23 and 24 which will preclude lateral slipping of the chains and their consequent engagement with one another, but this feature also is optional.

It will appear from the foregoing that all of the spits are mounted on the two brackets 3 and that these brackets, as well as all the spit rotating means associated with one of the brackets as described, are mounted for bodily pivotal movement on the axis of the pivots 3ª. This pivotal movement may be imparted to the bracket shown in Figure 1 by means of a hand screw 25 operated by a handle 26 and threaded through a knob 27 associated with the bracket. The two brackets 3 are secured together by tie-rods 28 as shown in Figure 2 so that by rotation of the handle 26 the brackets may be pivotally moved to shift the spits either toward or away from the source of heat and in this way the temperature of the various spits may be regulated.

Figure 3:
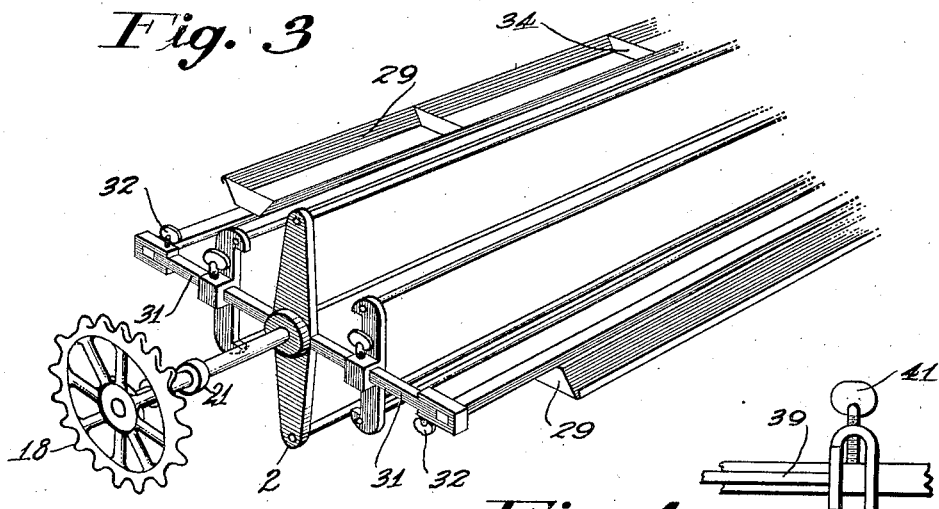
Figure 3 is a perspective view of one end of a spit constructed in accordance with this invention.

Various forms of spit may be employed in the carrying out of this invention and in Figures 3, 4 and 4ª I have shown two different styles. The spit shown in Figure 3 is of substantially the same form as disclosed in my issued patent No. 1,359,749 dated November 23, 1920, and differs mainly from the spit of my patent in that the spit shown in Figure 3 carries ladles 29 which, through the rotation of the spit, are periodically dipped beneath the surface of a pool of grease contained in a drip pan 30 associated with each spit and supported at the next subjacent tie-rod 28, as best shown in Figures 2 and 5. The ladles 29 are adjustable at the arms 31 of the spits and may be locked in adjustment by set screws 32, and these ladles are so mounted with respect to the direction of rotation of the spit that they face in the same direction. Thus, if the spit is rotated in a clockwise direction, as shown in Figure 5, the ladles will, through rotation of the spit, become charged from the pool of grease 33 and, as the rotation of the spit continues, this grease will be lifted and poured over the meat or fowl supported on the spit to effect the basting operation. If, in contradistinction, the spit is rotated in the opposite direction, as shown in Figure 6, the ladles will not dip up the grease and the flanges 29ª formed at the edges of the ladles will preclude dripping of the grease upon the broil.

It will thus appear that any spit put into the machine with its gear 18 in engagement with the chain 7, will be operated to effect basting of the broils supported thereon, while any split put into the machine with this gear 18 in engagement with the chain 12 will be rotated idly or to the exclusion of the basting operation. Accordingly, the chef is free to baste, or not baste, as he may desire and, in the machine of this invention, the broils on one or more spits may be basted, while the broils on one or more other spits may not be basted. In order to assure uniform basting through the entire length of the ladles, these ladles may be provided with partitions 34, as best shown in Figure 3.

The drip pans 30, as previously stated, are supported on the tie-rods 28, one pan being positioned beneath each spit so that each spit has its individual drip pan. The manner of supporting the pans may be varied without departing from the invention but, in the form shown in the drawings, the drip pans rest in cradle-like straps 35 which are riveted, bolted or otherwise fixed to the tie-rods 28. The forward end of each strap 35 is bent over to form a hook 36 adapted to hook over and engage with the forward edge of the drip pan, while the rear edge of the drip pan is clamped in position by a finger 37 forced down by a wing-nut 38. This arrangement permits the ready release of the drip pan when the chef desires to remove the same from the machine.

As hereinbefore stated, many different kinds of spits may be employed in the carrying out of this invention, and in Figures 4 and 4ª I have shown the second kind of spit which may be conveniently used. The spit shown in Figure 4 is of the type adapted to impale the broil and differs from the conventional spit of this type particularly that it carries ladles 29 similar to the ladles 29 in Figure 3. The ladles 29 are carried on rods 39 rigid with an end bar 40 adapted to be clamped in position on the shank of the spit by means of a set screw 41, as shown in Figure 4ª.

I have hereinbefore referred to guides 16 as associated with the forward reaches of both the sprocket chains. These guides serve the purpose not only of guiding the chains but also of precluding the forward reaches of said chains from backing off from the gears 18. When the guides 16 are employed the chains will be held firmly in engagement with the sprocket gears 18 so as to assure proper driving relation between these parts. The gear 13 is driven from the chain 7 through an intermediate sprocket gear not shown, in the manner hereinbefore described, and, if desired, the guide may be mounted on the arm 15 in such position as to cooperate with that portion of the rear reach of the chain 7 and function to keep this reach of the chain from backing off the gear or sprocket which it drives. In practice, this extra guide is preferred, though not absolutely essential.

In the foregoing description I have chosen to show the present invention as embodied in a machine of the general character described and claimed in my co-pending application Serial No. 420,189, wherein the spits are adjustable toward and away from the fire. I am aware, however, that the novel manner of basting broils is not restricted in this application to use in a machine having adjustable spits and it is capable, with equal efficiency, of employment in machines wherein the spits are not adjustable in the manner described such, for example, as in the machine of my co-pending application Serial No. 420,190. In fact, the present invention is capable of employment on any broiling apparatus embodying a rotary spit, since the rotation of such a spit may be utilized to dip grease from the drip pan and pour it over the broil. For these reasons, the present invention is not restricted to the specific construction shown but is to be understood as broadly novel as is commensurate with the appended claims.

Having thus fully described the invention, what I claim as new and desire to secure by Letters Patent, is:

1. A broiling apparatus embodying a plurality of rotatable spits adapted to support broils, a drip pan associated with each spit and adapted to contain a pool of grease, a ladle carried by each spit offcenter and adapted by rotation of the spit to be periodically submerged in the grease of the associated drip pan, a pair of drive members operable in opposite directions and a driven member associated with each spit and adapted to be brought into engagement with either of the drive members for the purpose of effecting rotation of such spit in either one direction or the other, whereby rotation of the spit in one direction will result in basting of the broil supported on the spit, whereas rotation of the spit in the opposite direction will be accomplished without concurrent basting of the broil.

2. A broiling apparatus embodying a plurality of rotatable spits adapted to support broils, a drip pan associated with each spit and adapted to contain a pool of grease, a ladle carried by each spit offcenter and adapted by rotation of the spit to be periodically submerged in the grease of the associated drip pan, a pair of sprocket chains adapted to travel in opposite directions, and a sprocket associated with each spit adapted to be brought into mesh with either chain so as to effect the driving of the spit in either direction, whereby rotation of the spit in one direction will cause basting of the broil, while rotation of the spit in the opposite direction will be accomplished without attendant basting.

3. A broiling apparatus embodying a plurality of rotatable spits adapted to support broils, a drip pan associated with each spit and adapted to contain a pool of grease, a ladle carried by each spit off center and adapted by rotation of the spit to be periodically submerged in the grease of the associated drip pan, and means for driving each spit in either one direction or the other, whereby rotation of a spit in one direction will result in basting of the broil supported on the spit, whereas rotation of a spit in the opposite direction will be accomplished without concurrent basting of the broil.

4. Broiling apparatus embodying a plurality of rotatable spits adapted to support broils, said spits being manually removable from the apparatus, means for locking the spits within the apparatus for rotation, a drip pan associated with each spit and adapted to contain a pool of grease, a ladle carried by each spit off center and adapted by rotation of the spit to be periodically submerged in the grease of the associated drip pan, a pair of drive members, operable in opposite directions, and a driving member associated with each spit and adapted to be placed in driving relation with either of the driving members for the purpose of effecting rotation of such spit in either one direction or the other, whereby rotation of the spit in one direction will result in the basting of the broil supported on the spit whereas rotation of the spit in the opposite direction will be accomplished without concurrent basting of the broil.

5. A rotisserie embodying a burner, a spit mounted on the rotisserie to rotate in broiling position relative to the burner, a drip pan supported on the rotisserie and in a position below the spit to catch grease falling from a roast positioned on the spit, said spit and drip pan being mounted on the rotisserie independently of one another to permit removal of the spit independently of the drip pan and vice versa whereby the drip pan can be removed from the rotisserie while the spit remains in operation on the rotisserie, and a ladle carried by the spit and adapted, through rotation of the spit, to be charged with grease from the associated drip pan and to discharge such grease on the roast carried by the spit.

6. A rotisserie embodying a burner, a supporting frame mounted on the rotisserie for movement toward and away from the burner, a spit supported for rotation on the frame, and a drip pan supported on said frame in a position below the spit to catch grease falling from a roast positioned on the spit, said drip pan being movable with the spit toward and away from the burner so as to be in cooperative relation to the spit in all roasting positions.

7. A rotisserie embodying a burner, a supporting frame mounted on the rotisserie for movement toward and away from the burner, a spit supported for rotation on the frame, a drip pan supported on said frame in a position below the spit to catch grease falling from a roast positioned on the spit, said drip pan being movable with the spit toward and away from the burner so as to be in cooperative relation to the spit in all roasting positions, the drip pan and spit being furthermore mounted on the frame independently of one another to permit removal of the spit from the frame independently of the drip pan and vice versa, and a ladle carried by the spit and adapted, through rotation of the spit, to be charged with grease from the drip pan and to discharge such grease on the roast carried by the spit.

In testimony whereof I have signed the foregoing specification.

MAX SCHEY.